Dec. 17, 1940.    R. S. KINKEAD    2,225,119
MOWER
Filed Aug. 28, 1939
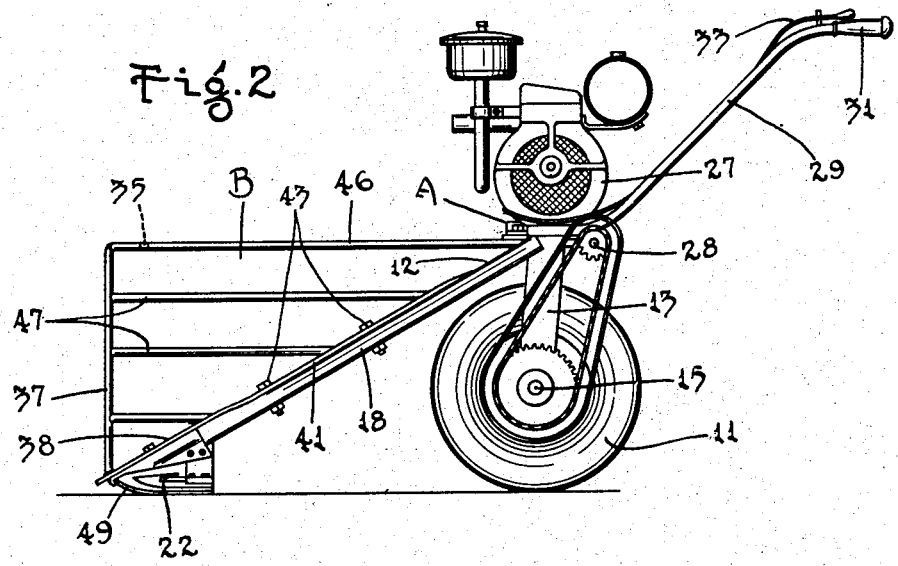
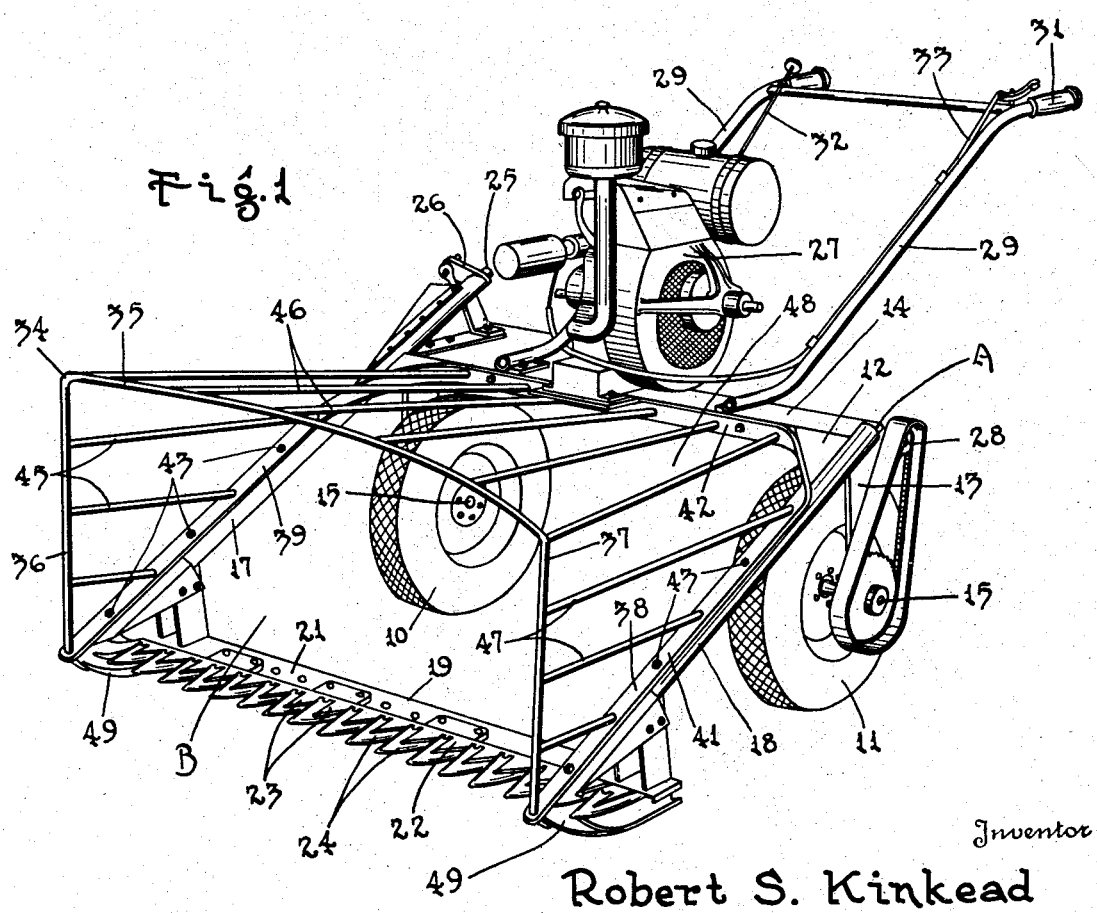
Inventor
Robert S. Kinkead Patented Dec. 17, 1940

2,225,119

UNITED STATES PATENT OFFICE 2,225,119

MOWER

Robert S. Kinkead, St. Paul, Minn.

Application August 28, 1939, Serial No. 292,227

3 Claims. (Cl. 56—26.5)

My invention relates to mowers and particularly to two-wheeled sickle type mowers and has for an object to provide a mower which will be extremely efficient and practical in operation.

Another object of the invention resides in providing a mower by means of which tall vegetation may be cut.

A still further object of the invention resides in providing a mower in which an opening is provided between the wheels of the mower and through the framework thereof and through which the vegetation may pass and in further providing means for positively causing the vegetation cut to pass through the said opening.

An object of the invention resides in providing a deflector for turning the tops of the vegetation cut away from the opening and directing the stalks of the vegetation cut into the opening.

Another object of the invention resides in utilizing a transverse bar as the said deflector and in disposing said bar above the sickle.

A feature of the invention resides in arranging the bar somewhat forwardly of the sickle.

Another object of the invention resides in positioning said bar at an elevation between sixteen and thirty inches above the sickle.

An object of the invention resides in providing means forming a tunnel open at the front and communicating with the opening through the framework of the mower and in further arranging said deflector at the forward end of the tunnel for directing the stalks of the vegetation cut into the tunnel.

Other objects of the invention reside in the novel combination and arrangement of parts and in the details of construction hereinafter illustrated and/or described.

In the drawing:

Fig. 1 is a perspective view of a mower illustrating an embodiment of my invention.

Fig. 2 is a side elevational view of the structure shown in Fig. 1.

In the use of mowers, such as illustrated in my Patent No. 2,063,168 issued December 8, 1936, considerable difficulty is encountered when a mower is used for cutting tall weeds or other vegetation which is greater in height than the distance of the horizontal frame member above the ground. In such cases the vegetation piles up ahead of the mower and will not pass through the opening in the mower provided for the purpose. When vegetation is cut by a machine of such character, the tops of the vegetation cut fall rearwardly and the piling up of the vegetation occurs. I have found that, when a deflector, such as shown in the instant application is employed and arranged, as disclosed, the tops of the vegetation cut are caused to fall forwardly and the stalks of the vegetation cut to fall rearwardly. This causes the vegetation to enter the opening in the framework of the mower stalk first and to pass through the same. I have found that, under the same conditions, vegetation that would clog the mower when the mower was used without the deflector, would readily pass through the mower when the deflector was employed. I have also found that tall vegetation five and six feet tall may be successfully cut and caused to pass through the opening in the frame work of the mower without difficulty when the mower is equipped with a deflector such as disclosed in the instant application for patent. My invention hence overcomes the difficulties heretofore encountered and above referred to.

For the purpose of illustrating the application of my invention, I have shown in Fig. 1 a mower which I have indicated in its entirety by the reference character A. This mower comprises two supporting wheels 10 and 11 which, in the instant case, are illustrated as being provided with rubber tires. These wheels are mounted on axles 15 which are journalled in suitable bearings carried by a framework indicated in its entirety by the reference numeral 12. This framework includes two vertical frame members 13 to which the bearings journalling the wheels 10 and 11 are attached. Such construction being well known in the art have not been illustrated in detail. The upper ends of these vertical frame members 13 have secured to them a horizontal frame member 14 which, in the particular mower shown, is disposed at an elevation above the wheels 10 and 11. Attached to the vertical frame members 13 and to the horizontal frame member 14 are two forwardly extending lateral frame members 17 and 18 which are tubular in form.

The sickle of the mower is designated in its entirety by the reference numeral 19 and consists of a sickle frame 21 and a sickle bar 22 reciprocable along said frame. This sickle bar carries knives 23 which are adapted to cooperate with similar knives 24 on the sickle frame and to cut the vegetation passing therebetween. The sickle frame 21 is carried by the forward ends of the lateral frame members 17 and 18 so that the sickle 19 may cut the vegetation fairly close to the ground. For supporting the mower at the locality of the sickle 19, two shoes 49 are employed which slide upon the ground and which are attached to the sickle frame 21. By means of the arrangement of the frame members of frame 12 and the disposition of the wheels 10 and 11, with reference to the sickle 19, an opening is provided through the said framework and between the wheels 10 and 11 through which the vegetation cut by the sickle 19 may pass. This opening is designated by the reference numeral 48 in Fig. 1.

The sickle bar 22 is reciprocated by means of a mechanism including a shaft 25 passing through one of the lateral frame members 17. This shaft has a lever 26 connected to it, which lever is operated through a suitable mechanism, not shown, by means of a gasoline engine 27, mounted on the horizontal frame member 14.

A shaft 28, also driven from the engine 27, serves to drive the axles 15 and 16 and to rotate wheels 10 and 11 whereby the mower is propelled.

Two handle bars 29, formed with hand grips 31 at the ends thereof, are attached to the horizontal frame member 14 and project rearwardly of the mower where the same may be grasped by the user who walks behind the mower and guides the same and controls the operation thereof. For the purpose of operating the mower controls 32 and 33 are carried by the handle bars 29 in easy reach of the operator.

The invention proper consists of a deflector 34 which is constructed from a bar or rod of metal and which is bent to form a cross bar 35, and uprights 36 and 37. The deflector 34 is attached to a frame 38, U-shaped in form, which has two legs 39 and 41, and a connecting portion 42 therebetween. This frame is preferably bent from bar material in the form shown. The connecting portion 42 of said frame is disposed along the forward edge of the horizontal frame member 14 of framework 12, while the legs 39 and 41 extend along the upper surfaces of the two lateral frame members 17. This frame is secured to the framework 12 by means of bolts 43 which extend through the frame 38 and are threaded into the framework 12. The lowermost ends of the uprights 36 and 37 of deflector 34 are welded or otherwise secured to the lower ends of the legs 39 and 41 of frame 38. It will be noted that the uprights 36 and 37 lie in the vertical planes containing frame members 17 and that the cross bar 35 is disposed upwardly above the sickle 19 and somewhat forwardly thereof.

In conjunction with the deflector 34 I employ a number of longitudinally extending bars 45, 46 and 47. The bars 45 are connected to the upright 36 and the leg 39 of frame 38. The bars 46 extend between the cross bar 35 of deflector 34 and the connecting portion 42 of frame 38. Bars 47 similarly extend between the upright 37 and the leg 41 of frame 38. All of these bars may be welded to the respective parts between which they extend or the same may be secured thereto in any suitable manner. These bars serve as guide members and form, in conjunction, a tunnel designated in its entirety by the reference character B, which tunnel is open at the front and communicates with the opening 48 through the framework 12 of the mower. The said tunnel is formed partly by the deflector 34, the forward edges of which serve to engage the vegetation being cut and to direct the same into the tunnel.

The operation of the invention is as follows: When the mower travels along the ground, the sickle 19 cuts the vegetation in close proximity to the ground. As the vegetation is cut the deflector 34, and particularly the cross bar 35 thereof, engages the vegetation and turns the tops of the vegetation forwardly of the mower and causes the stalks of the cut vegetation to be directed rearwardly into the tunnel B. When the vegetation is so directed, the same passes through the said tunnel and opening 48 of the framework 12, so that the vegetation passes completely through the mower and does not pile up in advance of the mower to clog the same. The uprights 36 and 37 also assist in turning over the vegetation where the vegetation is heavy, though the same merely separate the cut from the uncut portion of the vegetation where the vegetation is light.

I have found that the deflector bar 35 of my invention may be set at an elevation of between sixteen and thirty inches above the sickle depending upon the type of vegetation to be cut and the maximum height of the vegetation. Where the vegetation varies between twenty and thirty inches, the cross bar of the deflector may be set at an elevation of approximately sixteen inches. Where the vegetation to be cut is taller, the cross bar of the deflector may be set at an elevation up to thirty inches. In order to be of service in turning the vegetation I have found that the said bar should not be set at an elevation greatly exceeding thirty inches. At an elevation below fifteen inches the deflector does not greatly assist in causing the vegetation to pass through the mower, since with mowers constructed in accordance with the ordinary practice vegetation of this height will readily pass through without assistance. For average conditions I have found that an elevation between twenty and twenty-four inches above the sickle will handle most types and heights of vegetation and cause the same to pass through the mower without clogging.

The advantages of my invention are manifest. An extremely simple device is provided for procuring the desired results. My invention may readily be attached to existing mowers without appreciable reconstruction thereof. My invention utilizes no complicated or intricate parts and will function indefinitely without attention. With my invention the vegetation is positively fed through the mower so that extremely tall vegetation may be handled.

Changes in the specific form of my invention, as herein disclosed, may be made within the scope of what is claimed without departing from the spirit of my invention.

Having described my invention, what I claim as new and desire to protect by Letters Patent is:

1. In a mower, two spaced supporting wheels, a framework supported on said supporting wheels and including a transverse frame member spaced above the ground and forwardly extending lateral frame members, a sickle carried by the forward ends of said lateral frame members, the forwardly extending lateral frame member and wheel on one side of the mower being spaced from the corresponding parts on the other side of the mower, to provide an opening through which vegetation cut by the sickle may pass, a U-shaped deflector having uprights secured to the frame at the localities of the forward ends of the lateral frame members and a cross bar connected to the upper ends of said uprights, the forward edge of said cross bar being concave and disposed in a substantially horizontal plane.

2. In a mower, two spaced supporting wheels, a framework supported on said supporting wheels and including a transverse frame member disposed above the ground and forwardly extending lateral frame members, a sickle carried by the forward ends of said lateral frame members, the forwardly extending lateral frame member and wheel on one side of the mower being spaced from the corresponding parts on the other side of the mower to provide an opening through which vegetation cut by the sickle may pass a U-shaped deflector having uprights secured to the framework at the locality of the forward ends of the lateral frame members and a cross bar connected to the upper ends of the uprights, and longitudinally extending guide members connected to the cross bar and uprights and extending toward the framework of the mower and forming in conjunction with said frame work and deflector a tunnel through which the vegetation cut may pass, said deflector turning the tops of the vegetation cut away from the tunnel and directing the stalks of the vegetation cut into the tunnel.

3. In a mower, two spaced supporting wheels, a framework supported on said supporting wheels and including a transverse frame member spaced above the ground and forwardly extending lateral frame members, a sickle carried by the forward ends of said lateral frame members, the forwardly extending lateral frame member and wheel on one side of the mower being spaced from the corresponding parts on the other side of the mower to provide an opening through which vegetation cut by the sickle may pass, a U-shaped deflector having a transverse portion and upright portions connected to the transverse portion and extending upwardly from the forward ends of the lateral frame members in proximity to the ends of the sickle and guide means extending rearwardly from the transverse portions and upright portions of the U-shaped deflector toward the framework of the mower and providing sides and a top issuing rearwardly from the deflector and forming a tunnel for directing the vegetation cut into said opening.

ROBERT S. KINKEAD.